United States Patent [19]

Drlik

[11] Patent Number: 4,461,548
[45] Date of Patent: Jul. 24, 1984

[54] SPECTACLE FRAME

[75] Inventor: Günther Drlik, Pforzheim, Fed. Rep. of Germany

[73] Assignee: OBE-Werk Ohnmacht & Baumgartner GmbH & Co. K.G., Ispringen, Fed. Rep. of Germany

[21] Appl. No.: 254,144

[22] Filed: Apr. 14, 1981

[30] Foreign Application Priority Data

Apr. 23, 1980 [DE] Fed. Rep. of Germany ....... 3015548
Jun. 13, 1980 [DE] Fed. Rep. of Germany ....... 3022231

[51] Int. Cl.$^3$ .............................................. G02C 5/22
[52] U.S. Cl. .................................................. 351/153
[58] Field of Search ...................... 351/113, 111, 153; 16/228

[56] References Cited

U.S. PATENT DOCUMENTS 3,567,315 3/1971 Speer ................................. 351/113
3,837,735 9/1974 Guillet ................................ 351/153

*Primary Examiner*—John K. Corbin
*Assistant Examiner*—Rodney B. Bovernick
*Attorney, Agent, or Firm*—Balogh, Osann, Kramer, Dvorak, Genova & Traub

[57] ABSTRACT

This invention relates to a spectacle frame having metal or plastic bows, which can be forced open beyond their normal open position to bear resiliently on the head of the wearer. Each bow is connected to the rim of the spectacle frame by a hinge, which includes a bow-side part and a rim-side part. The hinge includes a spring mechanism, which at least in a plastic bow can be almost entirely or entirely accommodated. The hinge should be adapted to be used with metal bows in such a manner that only flat portions of the hinge protrude on the inside of the bow so that the bow will be flat and free from protruding hinge portions on the inside, which faces the face of the wearer. To accomplish these objects, the hinge includes a slidable plate, which is provided on the outside of the end portion of the bow and which is in spring-biased engagement with the rim of the spectacle frame when the bow is in its normal open position whereas the slidable plate is arranged to be urged back against spring force when the bow is forced open beyond its normal open position.

23 Claims, 8 Drawing Figures

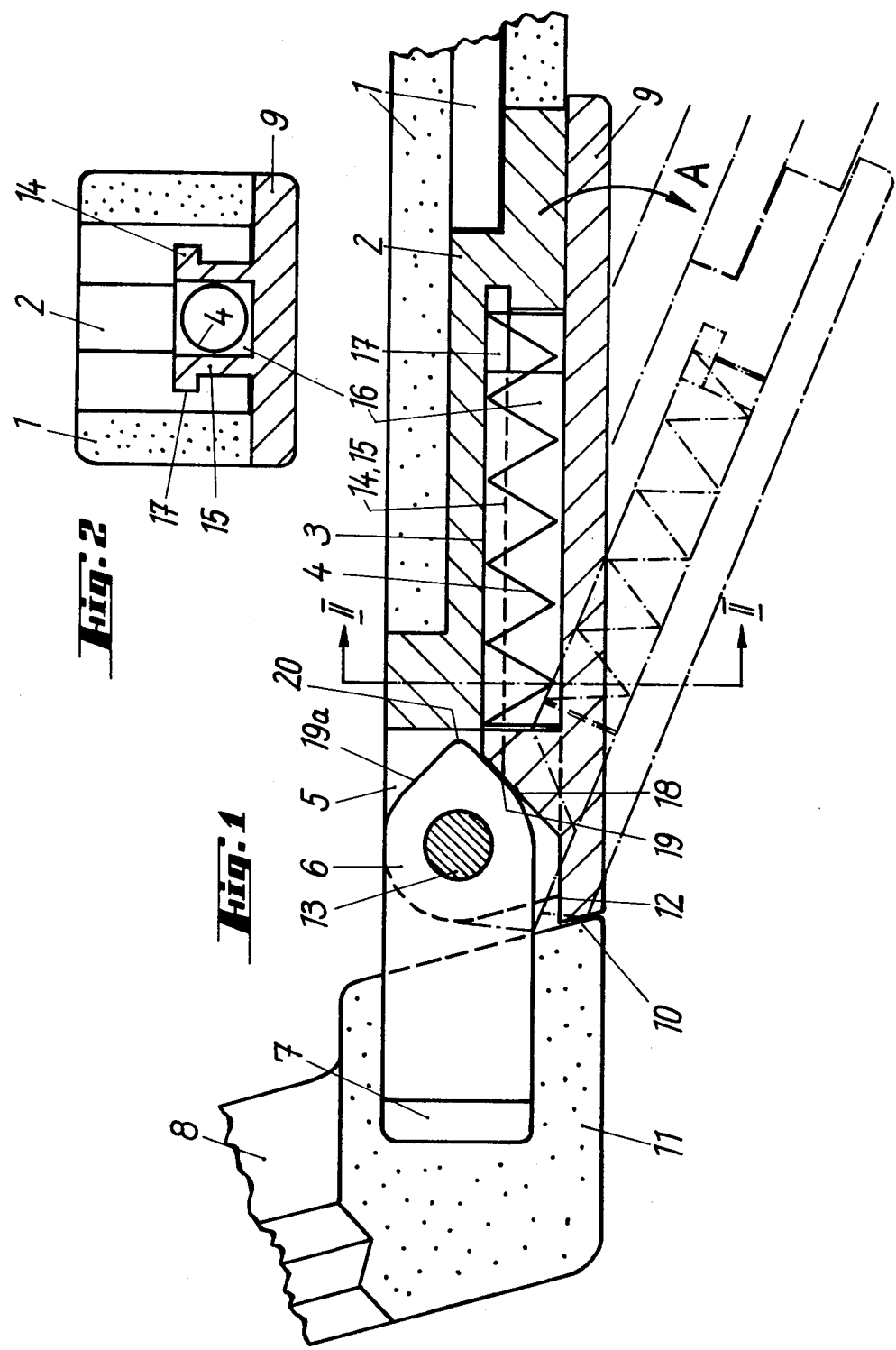

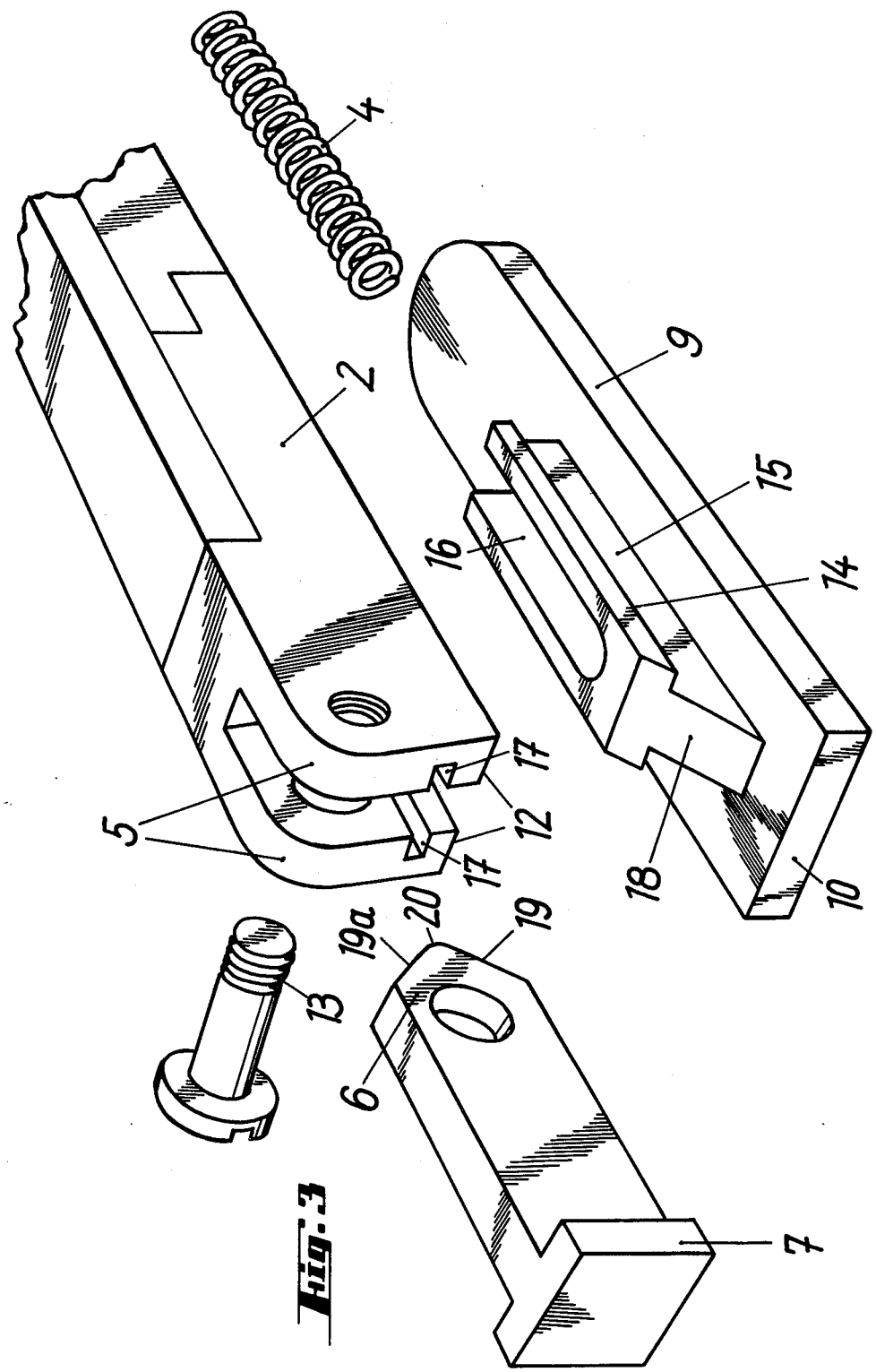

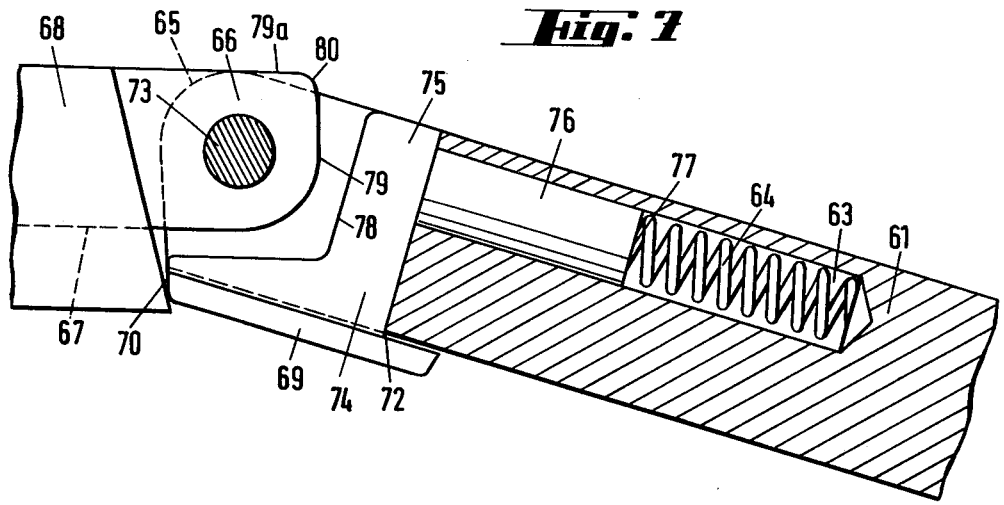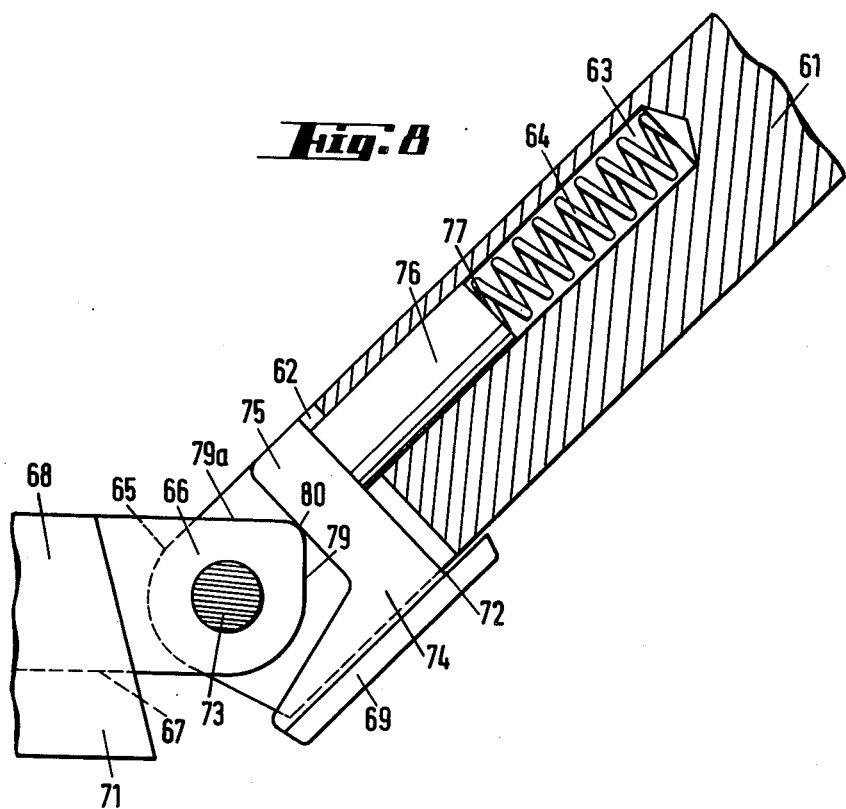

SPECTACLE FRAME

This invention relates to a spectacle frame including metal or plastic bows, which can be forced open beyond their normal open position so that they bear resiliently on the head of the wearer. Each bow is connected to the rim of the spectacle frame by a hinge, which includes a rim-side hinge part and a bow-side hinge part pivoted to the rim-side hinge part.

It is known to provide spectacle frames having plastic or metal bows with spring hinges, which permit the bows to be forced open beyond a stop-defined, normal open position so that the bows then bear resiliently on the head of the wearer. Such spring hinges comprise a rim-side hinge part and a bow-side hinge part, which is pivoted to the rim-side hinge part and has an extended end that is slidably mounted in a receptacle and adapted to be spring-urged from the forced-open position to the normal open position. German Early Disclosures 28 18 049 and 29 40 055 disclose such spring hinges in which the slidable elements and the means for guiding them are disposed on the inside of the end portion of the bow so that the thickness of the bow is increased inwardly and these parts face the face of the wearer and may injure the face or may clamp portions of the skin or hair of the wearer.

It is an object of the invention to provide a spectacle frame with a spring hinge which has a spring mechanism that can be accommodated to a large extent or even entirely in the end portion of a plastic bow and which even when used with a metal bow will protrude only slightly from the inside surface of the bow so that the bow has adjacent to the hinge a substantially smooth surface which is free from protruding portions of the hinge.

In a spectacle frame having plastic or metal bows, each of which is connected to the rim of the spectacle frame by a hinge and can be forced open beyond a stop-defined, normal open position and then bears resiliently on the head of the wearer, this object is accomplished in accordance with the invention in that the hinge includes a slidable plate, which when the bow is in its normal open position is in spring-biased engagement with the rim of the spectacle frame and is arranged to be urged back against spring force as the bow is forced open beyond its normal open position until the bow-side part of the hinge engages the rim of the spectacle frame. The end face of the slidable plate may be bevelled and in the closed position of the bow and in the normal open position of the bow may be spring-urged into engagement with respective mating peripheral surfaces of the eye of the rim-side part of the hinge.

In another embodiment, the slidable plate may include an angled guide bracket, which is provided near the end portion of the bow and embraces the rim-side part of the hinge and can be guided along the bow by means of a guide pin, which extends into the spring receptacle, and/or by a flange, which is carried by the bracket and in slidable engagement with the inside surface of the bow. The guide pin may extend into and be surrounded by the spring or may be slidably fitted in and guided by the bore which accommodates the spring.

Further details of the spectacle frame and hinge according to the invention will now be described with reference to the drawings, which show preferred embodiments of the hinge used with plastic and metal bows.

FIGS. 1 and 2 are, respectively, a central horizontal longitudinal sectional view and transverse sectional view showing a plastic bow, the adjacent portion of the rim of the spectacle frame and the hinge connecting the bow to said rim.

FIG. 3 is a perspective view showing the hinge parts, the slidable plate and the spring receptacle of the hinge of FIGS. 1 and 2.

FIGS. 7 and 8 show the bow of FIG. 6 in its forced open position and closed position, respectively.

Figure 4:
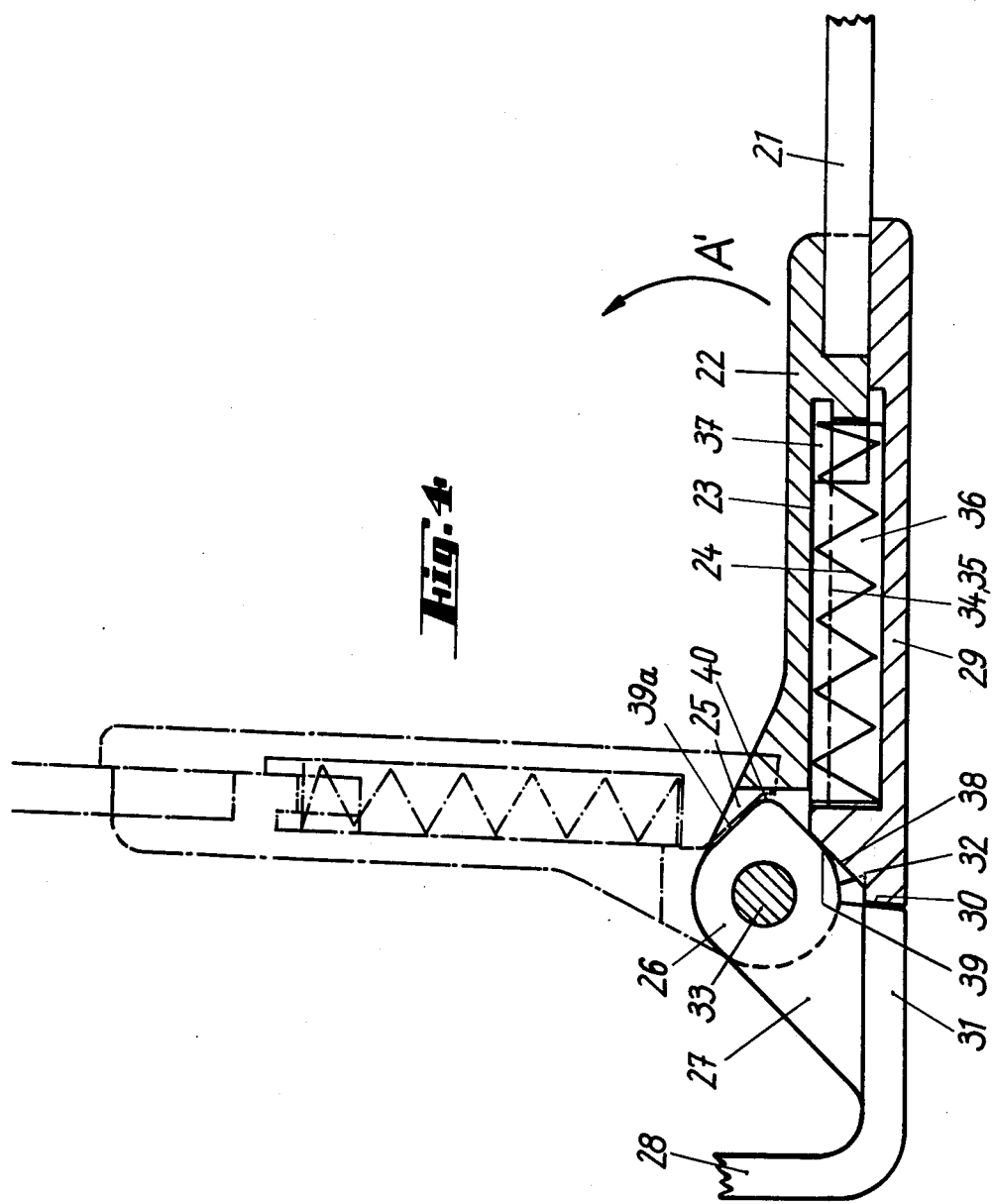
FIG. 4 is a central horizontal longitudinal sectional view showing a metal bow, the adjacent portion of the rim of the spectacle frame, and the hinge connecting the bow to said rim.

FIGS. 1 to 3 show a hinge used with a plastic bow. The bow includes a metal core and in its end portion 1 receives a bow-side hinge part 2, which has a cavity 3 for accommodating and guiding a compression spring 4. The part 2 also comprises an eye 5, which is pivoted to the eye 6 formed as an angular portion of the rim-side hinge part 7 mounted in the rim 8 of the spectacle frame. The rim-side hinge part 7 is also provided with a T-shaped portion in opposition to and integrally formed with the eye or angular portion 6. The bow-side part 2 of the hinge is provided on the outside with a slidable plate 9, which when the bow is in a normal open position engages with its end face 10 at the adjacent portion 11 of the rim 8 and which is urged back against the force of the spring 4 as the bow is forced open in the direction indicated by the arrow A until the bow-side part 2 of the hinge engages at 12 the adjacent portion 11 of the rim. The eyes 5, 6 are pivotally connected by a hinge screw 13.

The slidable plate 9 has a central longitudinal T-shaped guide bracket 15, which has a recess 16 accommodating the spring 4 and is formed with laterally outwardly protruding flanges 14, which are guided in track grooves 17 formed in opposite side portions of the bow-side hinge part 2. The bracket 15 has a bevelled end face 18, which faces the eye 6 of the rim-side hinge part 7 and is engageable under spring force with respective mating peripheral bevelled surfaces 19, 19a of said eye 6 when the bow is in its closed position or in its normal open position. The mating surfaces 19, 19a of the eye 6 include an angle of 90° and are separated by a nose 20 so that their engagement with the end face 18 will take place with a snap action.

In a spectacle frame as described hereinbefore, there will be no gap between the end of the bow and the adjacent portion of the rim when the bow is in its normal open position and in its forced-open position. Besides, the spring and the spring receptacle of the bow-side part of the hinge are entirely accommodated in the bow and the hinge has no parts protruding from the inside surface of the bow so that the inside surface is smooth. Only the slidable plate is visible, which is disposed on the outside and which may be ornamental.

In the second embodiment, shown in FIG. 4, the hinge is used together with a metal bow. The bow-side hinge part 22 is mounted on the end portion 21 of the bow and comprises an eye 25 and a receptacle 23 for the compression spring 24. The eye 25 is pivoted to the eye 26 of the rim-side part 27 of the hinge. The part 27 is mounted on the rim 28 of the spectacle frame. The bow-side hinge part 22 is aso provided on the outside with a slidable plate 29, which with its end face 30 engages the adjacent portion 31 of the rim 28 when the bow is in its normal open position. The slidable plate 29, which covers the area of the hinge, on its outer surface, will be forced back against the action of the spring 24 when the bow is forced open until the edge 32 of the bow-side part 22 engages the adjacent portion 31 of the rim 28. The eyes 25 and 26 are pivotally connected by the hinge screw 33.

In this embodiment, the slidable plate 29 carries a central longitudinal guide bracket 35, which has a recess 36 accommodating the compression spring and is formed with laterally outwardly protruding flanges 34, which are guided in track grooves 37 formed in opposite side portions of the bow-side hinge part 22. The guide bracket 35 has a bevelled end face 38 for a snap-action engagement under spring force with respective mating peripheral bevelled surfaces 39, 39a of the eye 26 as the bow is opened to its normal open position and as it is swung in the direction of the arrow A' to its closed position. The snap action is ensured by the nose 40, which is formed on the eye 26 between the mating surfaces 39, 39a, which include an angle of 90°.

Figure 5:
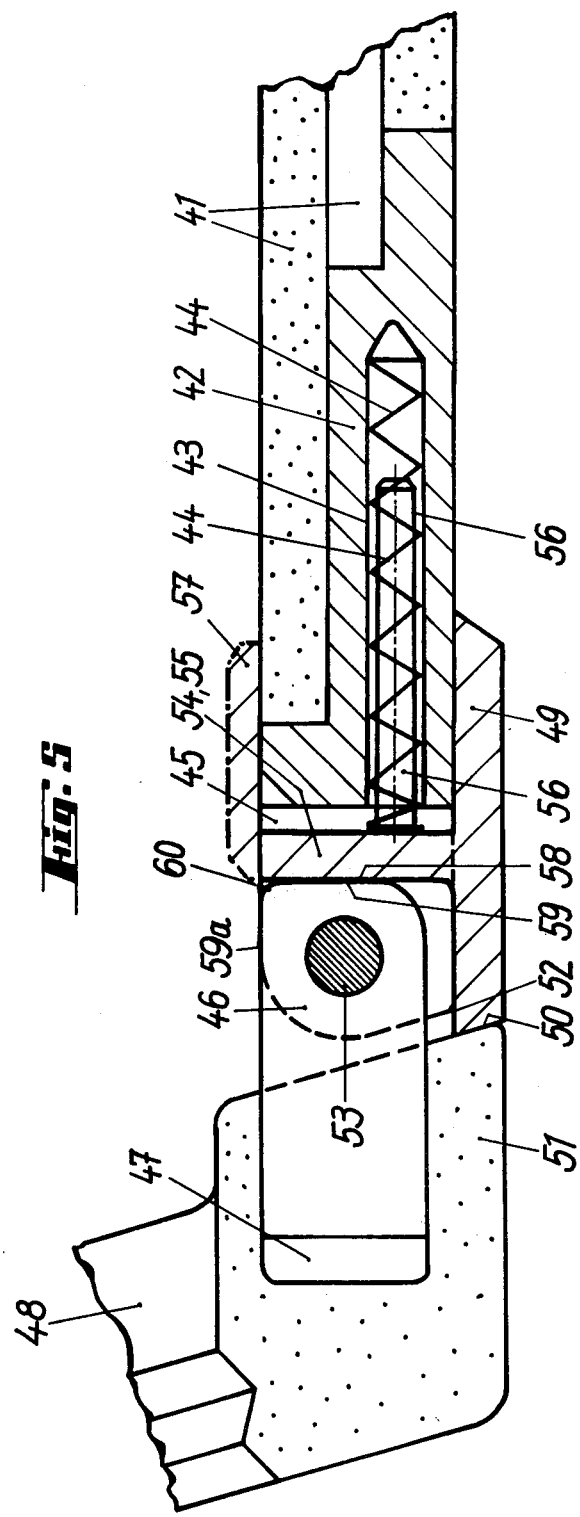
FIG. 5 is a central horizontal longitudinal sectional view showing a plastic bow, the adjacent portion of the rim of the spectacle frame, and the hinge connecting the bow to said rim.

In the third embodiment, shown in FIG. 5, the hinge is used with a plastic bow, which at its end portion 41 is provided with a bow-side hinge part 42. The latter comprises an eye 45 and a receptacle 43 for a compression spring 44. The eye 45 is pivoted to the eye 46 of the rim-side hinge part 47 carried by the rim 48. The bow-side hinge part 42 is provided on the outside with a slidable plate 49, which engages the adjacent portion 51 of the rim 48 when the bow is in its normal open position, and which is forced back against the action of the spring 44 when the bow is forced open until the bow-side hinge part 42 engages at 52 the adjacent portion 51 of the rim 48. The eyes 45 and 46 are again pivotally connected by a hinge screw 53.

The slidable plate 49 is provided with an inwardly protruding guide bracket 54, 55, which carries a pin 56 that is parallel to and spaced from the slidable plate 49 and is surrounded and guided by the compression spring 44. Instead of the pin 56, the bracket 54, 55 may be provided at its end opposite to the slidable plate 49 with a flange 57, which extends at right angles to the bracket 54, 55 and is in slidable contact with the inside surface of the bow and guided by the latter. The bracket 55 has a surface 58 which faces the periphery of the eye 46 and is capable of a snap-action engagement under spring force with respective mating peripheral surfaces 59, 59a of the eye 46 when the bow is in its closed position and in its normal open position. The snap action is ensured by a nose 60 provided between the peripheral surfaces 59, 59a, which include an angle of 90° and are at right angles to the longitudinal and transverse axes, respectively, whereas in the embodiments shown in FIGS. 1 to 4 the said surfaces are at an angle of 45° to said axes.

Figure 6:
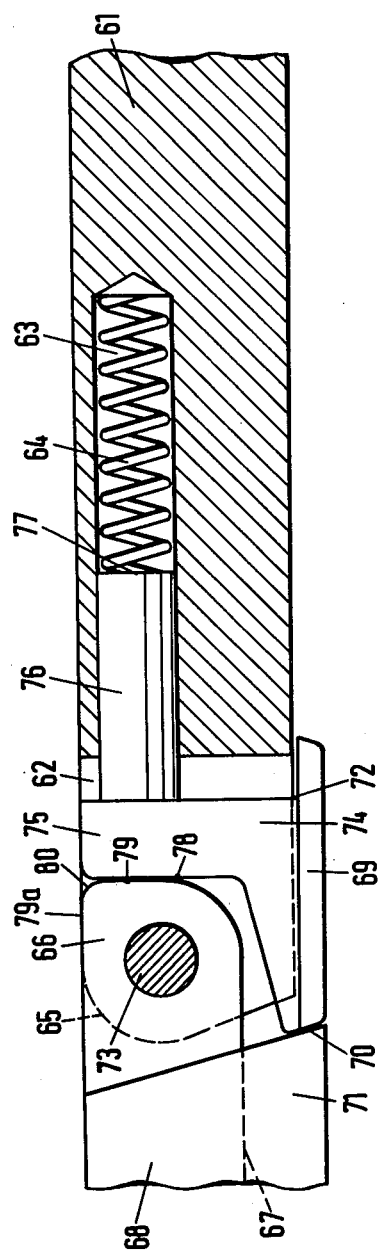
FIG. 6 is a diagrammatic view showing an additional embodiment.

The embodiment shown in FIGS. 6 to 8 is similar to that of FIG. 5. The bow has an end portion 61, which accommodates a bow-side hinge part 62, which comprises an eye 65 and a receptacle 63 for a compression spring 64. The eye 65 is pivoted to the eye 66 of the rim-side hinge part 67. Which is carried by the rim 68 of the spectacle frame. The bow-side hinge part 62 is provided on the outside with a slidable plate 69, which engages at 70 the adjacent portion 71 of the rim 68 when the bow is in its normal open position and which is forced back against the force of the spring when the bow is forced open until the bow-side hinge part 62 engages at 72 the adjacent portion 71 of the rim 68. This is apparent from FIG. 7. The eyes 65 and 66 are pivotally connected by the hinge screw 73.

The slide plate 69 carries a centrally disposed angled guide bracket 74, 75, which is arranged adjacent to the end portion 61 of the bow and extends around part of the periphery of the eye 66. The bracket 74, 75 carries a guide pin 76, which is slidably fitted in the bore of the receptacle 63. In said bore, the spring 64 is disposed behind the pin 76 and engages the latter at 77. The bracket 75 has a surface 78, which faces the mating peripheral surfaces 79, 79a formed on the hinge eye 66 and is capable of a snap action engagement therewith when the bow arrives at its closed position and when it is opened to its normally open position. The snap action (see FIG. 8) is ensured by the provision of a nose 80, which is disposed between the surfaces 79, 79a and is aligned with the inside surface of the bow when the latter is in its normal open position.

What is claimed is:

1. In a spectacle frame comprising a rim, a bow, and a hinge, said hinge comprising a rim-side part carried by said rim and a bow-side part carried by said bow and pivoted to said rim-side part, said bow being pivotally movable relative to said rim from a closed position to a normal open position and being adapted to be forced open beyond said normal open position to a forced-open position in which said bow is adapted to bear resiliently on a head of a wearer, and said frame comprising means which are interengageable to define said normal open position of said bow, said bow-side part being engageable with said rim to limit the movement of said bow beyond said normal open position, said rim-side part comprising a first eye formed as an angular member having first and second peripheral surfaces for cooperating with said bow-side part, said bow-side part comprising a second eye which is pivoted to said first eye, and said bow carrying means having an engaging surface which faces the periphery of said first eye and is engageable with said first and second peripheral surfaces as said bow is opened to said normal open position and closed to said closed position, respectively, the improvement residing in that said hinge comprises a slidable plate, which is disposed on the outside of said bow and slidable relative to said bow-side part along the outside of said bow into and out of engagement with said rim, so that the outer surface of said hinge is slidingly covered by said slidable plate and the inside of said bow is substantially free from protrusions of said hinge, said hinge comprises a spring, which is mounted in said bow-side part and arranged to urge said slidable plate into engagement with said rim when said bow is in said normal open position, said slidable plate is arranged to move along said bow to the end thereof against the force of said spring as said bow is forced open beyond said normal open position, said slidable plate being provided with a T-shaped guide bracket secured to and protruding inwardly therefrom, and said frame comprising guide means carried by said bow-side part of said hinge and in guiding engagement with said guide bracket, so that said slidable plate is slidingly guided on the outside of said bow, and in parallel to the outer side of the bow, into and out of engagement with said rim.

2. The improvement set forth in claim 1, wherein said slidable plate has an end face which constitutes said engaging surface.

3. The improvement set forth in claim 2, wherein said end face of said slidable plate is bevelled.

4. The improvement set forth in claim 1, wherein said angular member is formed between said first and second peripheral surfaces with a nose, which is engageable by said engaging surface and causes said engaging face to engage said first and second peripheral surfaces with a snap action.

5. The improvement set forth in claim 4, wherein said first and second peripheral surfaces include an angle of 90° with each other.

6. The improvement as set forth in claim 5, wherein said guide bracket is guided along said bow and has a surface which constitutes said engaging surface, and said nose is aligned with the inside of said bow when the latter is in said normal closed position.

7. The improvement set forth in claim 1, wherein said bow-side part is provided with said guide means.

8. The improvement set forth in claim 1, wherein said guide means are provided on opposite sides of said bracket.

9. The improvement set forth in claim 1, wherein said guide bracket extends along and is centered on said slidable plate and is formed with a recess which accommodates said spring.

10. The improvement set forth in claim 9, wherein said guide bracket has a bevelled end face which faces the periphery of said first eye and is engageable with said first and second peripheral surfaces as said bow is opened to said normal open position and closed to said closed position, respectively.

11. The improvement set forth in claim 1, wherein said guide bracket is angled and extends around part of the periphery of said first eye.

12. The improvement set forth in claim 11, wherein said bow-side part comprises a receptacle accommodating said spring and said guide bracket carries a pin, which is parallel to said slidable plate and extends into said receptacle.

13. The improvement set forth in claim 12, wherein said guide pin is surrounded by said spring.

14. The improvement set forth in claim 12, wherein said guide pin is slidably fitted in said receptacle and has a free end face engaged by said spring.

15. The improvement set forth in claim 11, wherein said guide bracket carries a flange, which is parallel to said slidable plate and in slidable contact with said bow on the inside surface thereof.

16. The improvement set forth in claim 1, wherein said bow-side part comprises a receptacle which is carried by said bow and accommodates said spring, and said slidable plate is slidably mounted on said receptacle.

17. The improvement set forth in claim 16, wherein said bow comprises a body of plastic material and said receptacle is accommodated in said body.

18. The improvement set forth in claim 1, wherein said slidable plate is guided in a recess on the outside of said bow.

19. The improvement set forth in claim 1, wherein said slidable plate is guided by said bow-side part.

20. The improvement set forth in claim 1, wherein said slidable plate is comprised in an assembly which embraces said bow.

21. The improvement set forth in claim 1, wherein said slidable plate is ornamental.

22. The improvement set forth in claim 1, wherein said rim-side part of said hinge comprises a T-shaped member in opposition to and integrally formed with said angular member.

23. The improvement set forth in claim 1, wherein said bow-side part of said hinge comprises track grooves formed in opposite side portions thereof, and said guide bracket is formed with laterally outwardly protruding flanges which are guided in said track grooves.

* * * * *